Dec. 29, 1942.   E. A. DAVIS ET AL   2,306,528
BEARING STRUCTURE
Filed Nov. 5, 1940

Inventors
Edward A. Davis
Pratt Jones
By Willis F. Avery
Atty.

Patented Dec. 29, 1942

2,306,528

UNITED STATES PATENT OFFICE 2,306,528

BEARING STRUCTURE

Edward A. Davis and Pratt Jones, Akron, Ohio, assignors to The B. F. Goodrich Company, New York, N. Y., a corporation of New York Application November 5, 1940, Serial No. 364,384

10 Claims. (Cl. 308—63)

This invention relates to bearing structures and is particularly useful in apparatus for balancing annular objects such as tires or wheel and tire assemblies.

It has been the practice to determine the balance of an annular body such as a wheel and tire assembly by pivotally supporting the assembly from a point on its axis and then observing its tendency to tip from a horizontal plane as it is rotated. To provide for tipping in any direction, a hardened ball of metal, such as steel has been employed for the pivotal member. Such pivotal member has exhibited rapid wear and has developed flat spots leading to inaccurate measurements of balance. The present invention aims to overcome the foregoing difficulties and to provide an accurate balancing mechanism.

The principal objects of the invention are to provide for rotational shifting of the fulcrum member to preserve its shape by regularly shifting the wearing spot, to provide for effecting this result automatically, and to provide simplicity of structure. A further object is to provide for rotational shifting of a spherical fulcrum member on a plurality of axes.

These and other objects will appear from the following description and the accompanying drawing.

Figure 1:
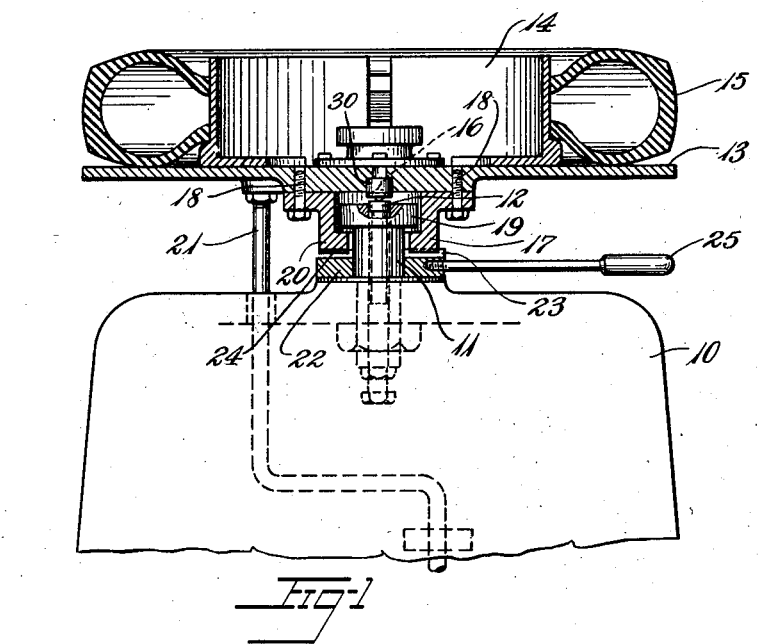
Fig. 1 is a sectional elevation of a tire balancing machine constructed in accordance with and embodying the invention, parts being broken away.

In accordance with the invention there is provided a mounting for seating a bearing member, retaining means for the bearing member which permits limited rotative and translational movement thereof, and means for rotatably shifting the bearing member during a translational movement resulting from lifting the bearing member from its companion bearing member.

Referring to the drawing, the numeral 10 designates the supporting frame of a tire-balancing machine which has a pedestal 11 fixed thereto which supports a fixed bearing 12 in the form of a block of hard material, such for example as "carboloy," having a flat upper surface.

A table 13 has a locating flange 14 of split construction fixed thereto whereby a tire casing 15 may be mounted on the table and centered from its rim-engaging surface. The table is supported from the pedestal 11 by a spherical bearing member 16 of hardened steel or other suitable material which rests on the fixed bearing member 12 when the apparatus is in use. A retaining collar 17 depends from the table 13 to which it is secured by bolts 18 and loosely encloses the pedestal 11, the pedestal and the collar having overlapping flanges 19 and 20 which limit the extent to which the bearing members may be separated. A counterbalance rod 21 is fixed to the table and depends therefrom to a position below the bearing members where it supports a weight (not shown) adapted to lower the center of gravity of the balanced apparatus.

For arresting any tipping movement of the table and to raise the upper bearing member from the lower one when loading and unloading the table, an annular cam ring 22 is rotatably mounted about the pedestal 11 and is formed with annularly inclined surfaces 23 on its upper face adapted to engage complementary annularly inclined surfaces 24 formed on the lower face of the collar 17, the arrangement being such that when the cam 22 is rotated in one direction, as by a handle 25 attached thereto, the table is arrested and the upper bearing lifted from the lower one, and when the cam is rotated in the opposite direction, the table is released and the bearing members brought into contact.

Figure 2:
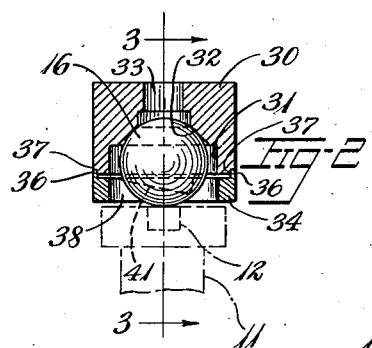
Fig. 2 is a vertical sectional view of the upper bearing member and the ball-rotating means, in weight-sustaining position, the lower bearing member being shown in dot-and-dash lines.
Figure 5:
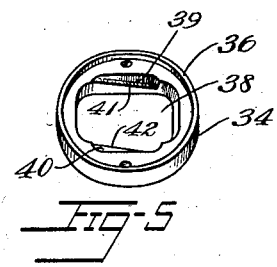
Fig. 5 is a perspective view of the ball shifting means.
Figure 3:
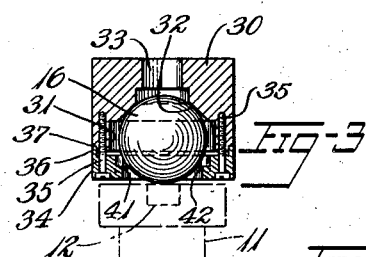
Fig. 3 is a cross-section view taken on line 3—3 of Fig. 2.
Figure 4:
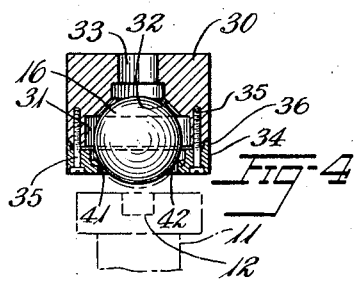
Fig. 4 is a view similar to Fig. 3 but with the upper bearing lifted free of the lower bearing.

As shown in Figs. 2 to 5, the spherical upper bearing member 16 is retained by a cupped bushing 30. This bushing has an annular cavity 31 larger in diameter than the ball 16, a conical seat 32 for centering the ball thereabove, and a clearance opening 33 above the ball when the ball is seated.

For retaining the ball near the conical seat 32 and for automatically shifting the ball to a new seating position each time the table is lifted to separate the bearing members, a retaining ring 34 is secured to the lower face of the bushing 30, as by screws 35 passing therethrough and engaging threaded openings in the bushing. A flange 36 formed at its upper outer margin acts to center it over a rebate 37 formed on the bushing. The retaining ring has a substantially rectangular opening 38 therethrough which is longer in one direction than the diameter of the ball and narrower in the other direction than the diameter of the ball. The upper margins of the long sides adjacent the rectangular opening are rebated as at 39, 40 so as to provide ledges 41, 42 inclined with respect to the horizontal and sloped in the same direction. The margins of the ledges act as inclined rails which contact with the ball when the ball drops from its conical seat and along which the ball then rolls out of center with the conical seat, the cavity 31 being formed of sufficient dimensions and the opening 38 being of sufficient length to provide clearance for permitting such rolling movement. The ledges may be parallel but it is preferred to make one lower than the other or the ledges in wind so as to provide rotation of the ball on two axes.

In the operation of the apparatus, with the ball 16 of the upper bearing member resting upon the lower bearing member, the ball is centered by the conical surface 32. By rotating the ring 22, the table, and with it the bushing 30, which is fixed thereto is lifted until the flanges of the pedestal 11 and the collar 17 engage each other. During such movement, the inclined rails 41, 42 contact with the ball as the ball is lifted from contact with the lower bearing member. The ball rolls along the inclined rails out of the vertical axis of the bushing. When the table is lowered, the ball contacts with the lower bearing surface before it is seated in the conical seat 32 and on continued table-lowering movement the conical surface 32 contacts with the ball causing it to roll on the lower bearing surface into vertical alignment with the conical surface 32. The fractional rotation of the ball during each table-lowering and lifting movement causes the ball to seat on the lower bearing member at a different position of the surface of the ball at each balancing operation, thereby preventing the ball from wearing flat. The clearance limiting translational movement of the spherical bearing member may be of such an amount that the angle of rotation of the bearing is not evenly divisable into 360° or a small multiple thereof, thereby making use of an infinite number of bearing points on the bearing.

Variations may be made without departing from the scope of the invention as it is defined by the following claims.

We claim:

1. A pivoted bearing structure having a lower bearing member and an upper bearing member adapted to rest thereon for pivotally supporting a load therefrom, and means for raising said upper bearing member from said lower bearing member to relieve said bearing members from the load, said upper bearing member comprising a seat formed with upwardly convergent walls, a fulcrum member having a surface of revolution adapted to be seated between said walls in its load-sustaining position, means for retaining said fulcrum member loosely between said walls while permitting limited movement thereof to a position lateral of said load-sustaining position, and means to effect lateral movement of said fulcrum member along different paths for changing the fulcrum point of said fulcrum member between successive load-sustaining operations.

2. A pivoted bearing structure having a lower bearing member and an upper bearing member adapted to rest thereon for pivotally supporting a load therefrom, and means for raising said upper bearing member from said lower bearing member to relieve said bearing members from the load, said upper bearing member comprising a seat formed with upwardly convergent walls, a fulcrum member having a surface of revolution adapted to be seated between said walls in its load-sustaining position, means for retaining said fulcrum member loosely between said walls while permitting limited movement thereof to a position lateral of its load-sustaining position, and means comprising a track associated with said retaining means for changing the fulcrum point of said fulcrum member between successive load-sustaining operations.

3. A pivoted bearing structure having a lower bearing member and an upper bearing member adapted to rest thereon for pivotally supporting a load therefrom, and means for raising said upper bearing member from said lower bearing member to relieve said bearing members comprising a seat formed with upwardly convergent walls, a fulcrum member having a surface of revolution adapted to be seated between said walls in its load-sustaining position, means for retaining said fulcrum member loosely between said walls while permitting limited movement thereof to a position lateral of its load-sustaining position, and means comprising an inclined track associated with said retaining means for rotating said fulcrum member between successive load-sustaining operations to present another fulcrum point thereof to the lower bearing member.

4. A pivotal bearing structure having a lower bearing member and an upper bearing member adapted to rest thereon for pivotally supporting a load therefrom, and means for raising said upper bearing member from said lower bearing member to relieve said bearing members from the load, said upper bearing member comprising an annular seat having upwardly convergent walls, a spherical fulcrum member adapted to be seated therein in its load-sustaining position, means for retaining said fulcrum member loosely adjacent said seat while permitting limited movement thereof to a position lateral of said load-sustaining position, and means comprising an inclined track on which the spherical member is adapted to roll for changing the fulcrum point of said fulcrum member between successive load-sustaining operations.

5. A pivotal bearing structure having a lower bearing member and an upper bearing member adapted to rest thereon for pivotally supporting a load therefrom, and means for raising said upper bearing from said lower bearing to relieve said bearing members from the load, said upper bearing member comprising an annular seat having upwardly convergent walls, a spherical fulcrum member adapted to be seated therein in its load-sustaining position, means for retaining said fulcrum member loosely adjacent said seat while permitting limited movement thereof to a position lateral of its load-sustaining position, and means for changing the fulcrum point of said fulcrum member between successive load-sustaining operations, said fulcrum point changing means comprising a pair of rails on said sustaining means and inclined horizontally so as to engage the spherical fulcrum member and to induce a rolling movement thereof.

6. A bearing structure comprising a bearing element for intermittently supporting a load by localized contact of said bearing element with a cooperating element, means for moving the load and said bearing element into spaced-apart relation for relieving said element of the load, and means operative after such relieving movement for effecting a shifting of said bearing element laterally and returning it in a manner to change the position of load-supporting contact.

7. A bearing structure comprising a bearing element having a surface of rotation for intermittently supporting a load by localized contact of said surface with a cooperating element, means for moving the load and said bearing element into spaced-apart relation for relieving said element of the load, and means operative after such relieving movement for effecting a lateral shifting and return of said bearing elements in a manner to cause rotative shifting of said surface of revolution to change the position of load-supporting contact on said bearing element.

8. A bearing structure comprising a spherical element, a bearing surface adapted to contact said element in load-supporting relation, means for separating said spherical element and surface out of contact, and means operative after such separation for effecting lateral rolling movement of said spherical element and return along different paths to position another portion of its surface for contact with said bearing surface at a subsequent load application.

9. A bearing structure as defined in claim 8 in which said means for effecting the lateral rolling movement of said spherical element comprises an inclined track on which said element is adapted to roll.

10. A bearing structure comprising a spherical bearing element, an inclined support upon which said element is adapted to roll, centering means for said element, a member having a bearing surface upon which the spherical element is adapted to roll, and means for effecting relative movement of said member and inclined support to transfer the spherical member from the inclined support to said centering means by a rolling motion of the spherical element along said bearing surface.

EDWARD A. DAVIS.
PRATT JONES.